US006498819B1

(12) United States Patent
Martin

(10) Patent No.: US 6,498,819 B1
(45) Date of Patent: Dec. 24, 2002

(54) INTEGRATED MULTI-MODE BANDPASS SIGMA-DELTA RECEIVER SUBSYSTEM WITH INTERFERENCE MITIGATION AND METHOD OF USING SAME

(75) Inventor: William J. Martin, Ft. Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/579,632

(22) Filed: May 26, 2000

Related U.S. Application Data

(63) Continuation-in-part of application No. 09/174,628, filed on Oct. 19, 1998, now Pat. No. 6,160,859.

(51) Int. Cl.[7] .............................................. H04L 27/08
(52) U.S. Cl. ..................... 375/345; 375/316; 341/143
(58) Field of Search ................................. 375/345, 346, 375/349, 350, 355, 316, 254, 247, 285, 329, 377; 455/232.1, 234.1; 329/304; 341/143, 139, 155, 157

(56) References Cited

U.S. PATENT DOCUMENTS 5,345,409 A    9/1994    McGrath et al. ............ 364/736
5,442,353 A    8/1995    Jackson ....................... 341/143
5,541,600 A    7/1996    Blumenkrantz et al. .... 341/139
5,621,345 A    4/1997    Lee et al. .................... 327/254
5,689,440 A   11/1997    Leitch et al. ............. 364/514 R
5,787,125 A    7/1998    Mittel ......................... 375/329
6,151,354 A *  11/2000   Abbey ......................... 375/211

* cited by examiner

Primary Examiner—Jean Corrielus
(74) Attorney, Agent, or Firm—Frank M. Scutch, III

(57) ABSTRACT

An integrated sigma-delta radio frequency (RF) receiver subsystem (200) and method utilizes a multi-mode sigma-delta analog-to-digital converter (215) for providing a single and multi-bit output. A programmable decimation network (221) for reducing the frequency of the in-phase and quadrature bit stream and a programmable formatting network (223) are also used for organizing the in-phase and quadrature components from the decimation network (221) for subsequent signal processing. The invention offers a highly integrated digital/analog RF receiver back-end which incorporates integrated filtering and a smart gain control that is compatible for use with other receiver systems and offering superior performance characteristics. Dynamic programmable interference mitigation is provided which facilitates power reduction and use in multi-tier products.

29 Claims, 3 Drawing Sheets

INTEGRATED MULTI-MODE BANDPASS SIGMA-DELTA RECEIVER SUBSYSTEM WITH INTERFERENCE MITIGATION AND METHOD OF USING SAME

CROSS REFERENCE TO RELATED APPLICATIONS

This application is a continuation-in-part of U.S. application Ser. No. 09/174,628, filed Oct. 19, 1998, by Martin, et al., entitled "Integrated Multi-Mode Bandpass Sigma-Delta Receiver Subsystem with Interference Mitigation and Method of Using Same," and assigned to Motorola, Inc. now U.S. Pat. No. 6,160,859.

TECHNICAL FIELD

This invention relates in general to radio receivers and more particularly to integrated digital radio receiver subsystems.

BACKGROUND

It is well known in the art that a dual conversion radio receiver converts incoming radio frequency (RF) signals using a common heterodyning process with two mixers. The RF signal is most often detected, converted and amplified into an audible format using some type of transducer such as a speaker. As seen in prior art FIG. 1, a known integrated radio receiver back-end or second intermediate frequency stage 10 will include an IF signal input 11 that is amplified by preamp 13 and then fed to a mixer 15 where it is mixed with a signal from a local oscillator synthesizer 17 controlled by a clock synthesizer 19. The resultant second IF signal is then processed by a bandpass sigma-delta (Σ-Δ) converter 21 where it is noise shaped and converted into a digital format. Undesired out of band components of the converter signal can then be filtered using a discrete time filter 23. Thereafter, it is further processed and mixed to baseband using a frequency translator 25. Undesired components of this resultant signal are filtered using another discrete time filter 29 whose output is fed to the parallel to serial data converter 33 and the output 35. In order to limit the input signal to the Σ-Δ converter 21, an automatic gain control (AGC) circuit is employed to keep the Σ-Δ converter out of "clip" and reduce signal distortion.

Thus, as can be readily seen from FIG. 1, the radio receivers of today have greatly increased in complexity where they are not only highly integrated but also convert analog signals into a digital format where they can be manipulated and/or digitally processed for use as either audible information or data.

One problem typically associated of such high level integration of digital radio receiver has been to provide the back-end i.e. the second intermediate frequency (IF) components in addition to the digital mode sigma-delta converter in one integrated package. Specific obstacles such as analog or lumped filters (such as inductor-capacitor (LC) filters or ceramic resonators), have made such integrated circuits difficult to use and implement. Thus, the need exists to provide a highly integrated digital/analog RF receiver back-end which incorporates integrated filtering and a smart gain control that is easy to use with other receiver systems and offers superior performance characteristics.

DETAILED DESCRIPTION OF THE PREFERRED EMBODIMENT

Figure 1:
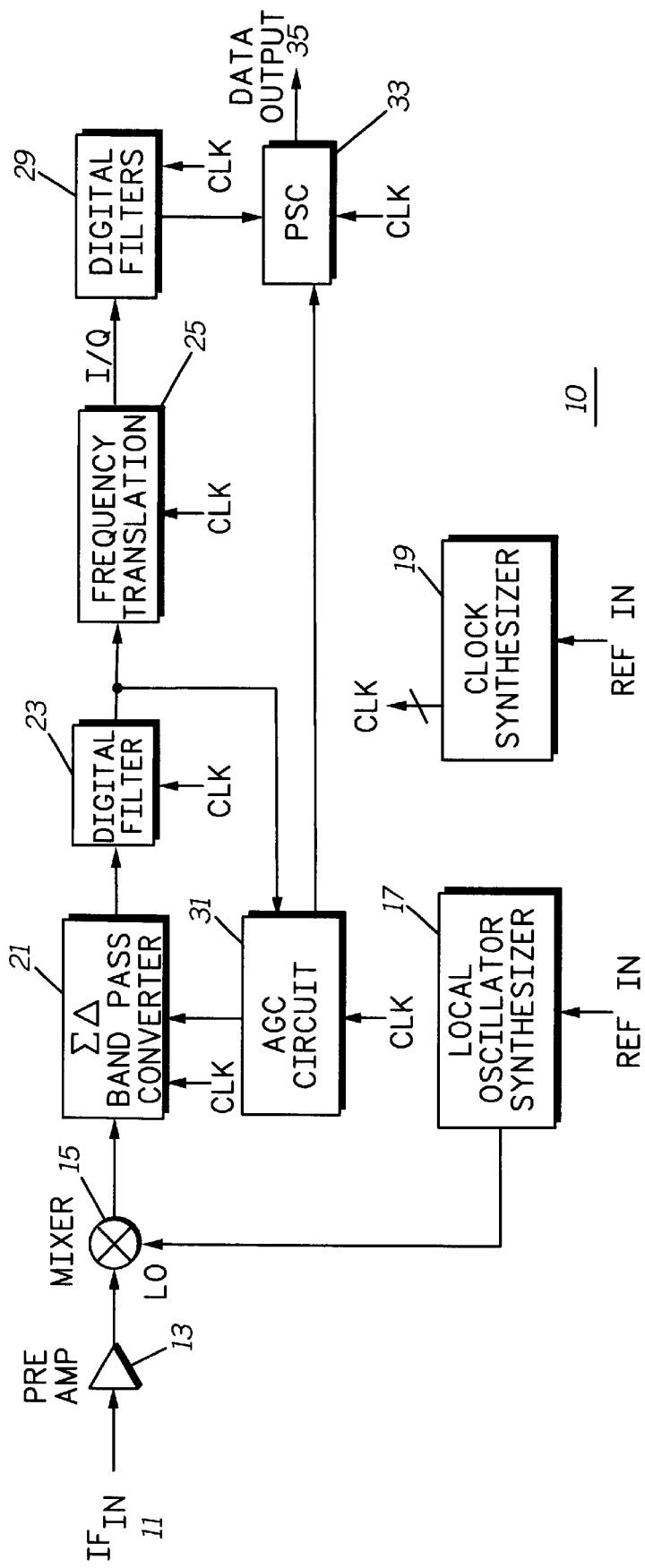
FIG. 1 is a block diagram showing an operational diagram of a back-end radio receiver used in the prior art that employed a single mode sigma-delta converter.
Figure 2:
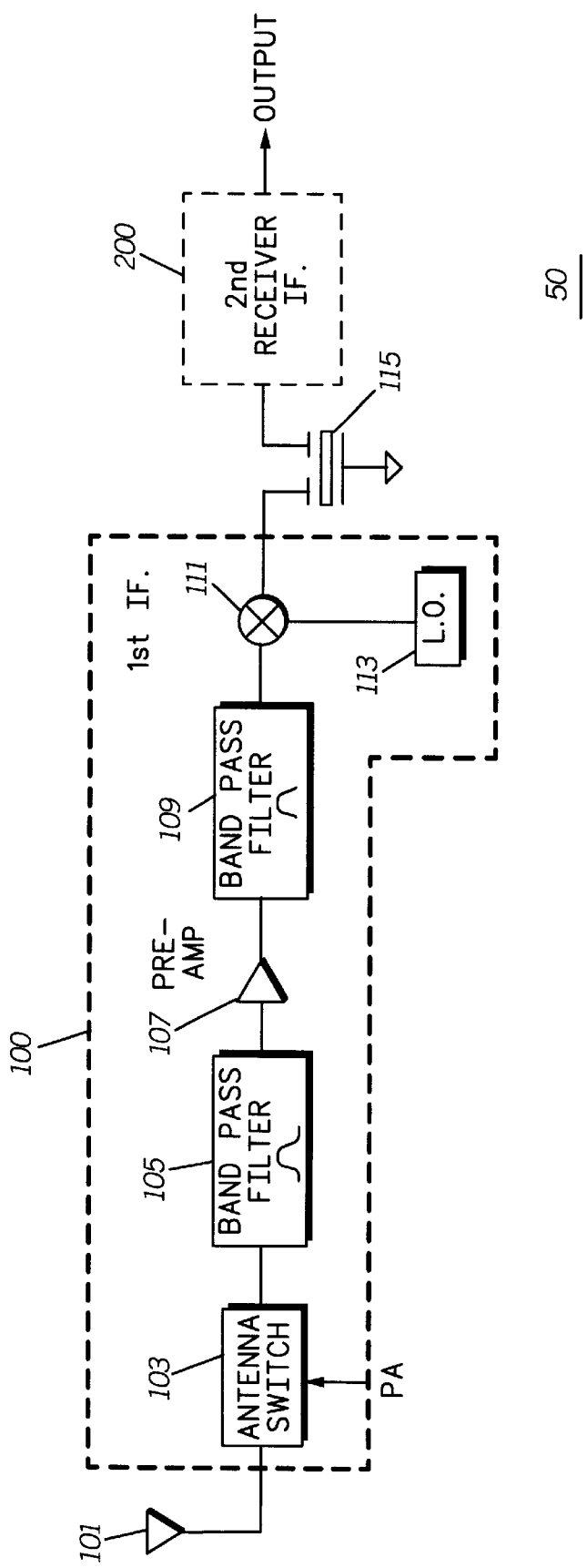
FIG. 2 is a block diagram showing implementation of a super heterodyne receiver that employs the multi-mode sigma-delta receiver subsystem 200.

Referring now to FIG. 2, a general block diagram of a digital dual conversion radio frequency (RF) receiver 50 includes a receiver first intermediate frequency stage 100 also known as the receiver front-end and a receiver second intermediate frequency stage 200 also known as the receiver back-end.

As is generally known in the art, the receiver front end 100 includes RF signals received though an antenna 101 or other input device that is fed through an antenna switch 103 that switches the antenna 101 between the power amplifier and receiver depending on the mode of the electronic device. A band pass filter 105 acts to filter undesired RF signals outside a specific passband. The remaining filtered signal is amplified using preamp 107 and subjected to another bandpass filter 109 increasing selectivity. Thus, only a narrow band of RF signals are applied to the first mixer 111.

The first mixer 111 uses the RF signal from the bandpass filter 109 where it is mixed with a stable local oscillator signal 113 and output for use by the receiver back-end 200. As is also well known in the art, the first intermediate frequency (IF) signal from the first mixer 111 produces a signal at the sum and difference frequencies of the input signals. Since the primary signal of interest is the difference signal, the sum signal will subsequently be filtered in later receiver stages. In order to couple the RF signal from the receiver front end 100 to the receiver back end 200, a multiple-pole filter 115 can be used to provide a moderate degree of selectivity from the front-end 100 with substantially low signal. loss. As known to those skilled in the art, the multiple-pole filter 115 may be a crystal filter, surface acoustic wave (SAW) filter or the like. A wide band crystal or SAW filter is allowable due to the wide dynamic range of the bandpass sigma-delta analog-to-digital converter (ADC). This has the advantage of size and cost reduction.

Figure 3:
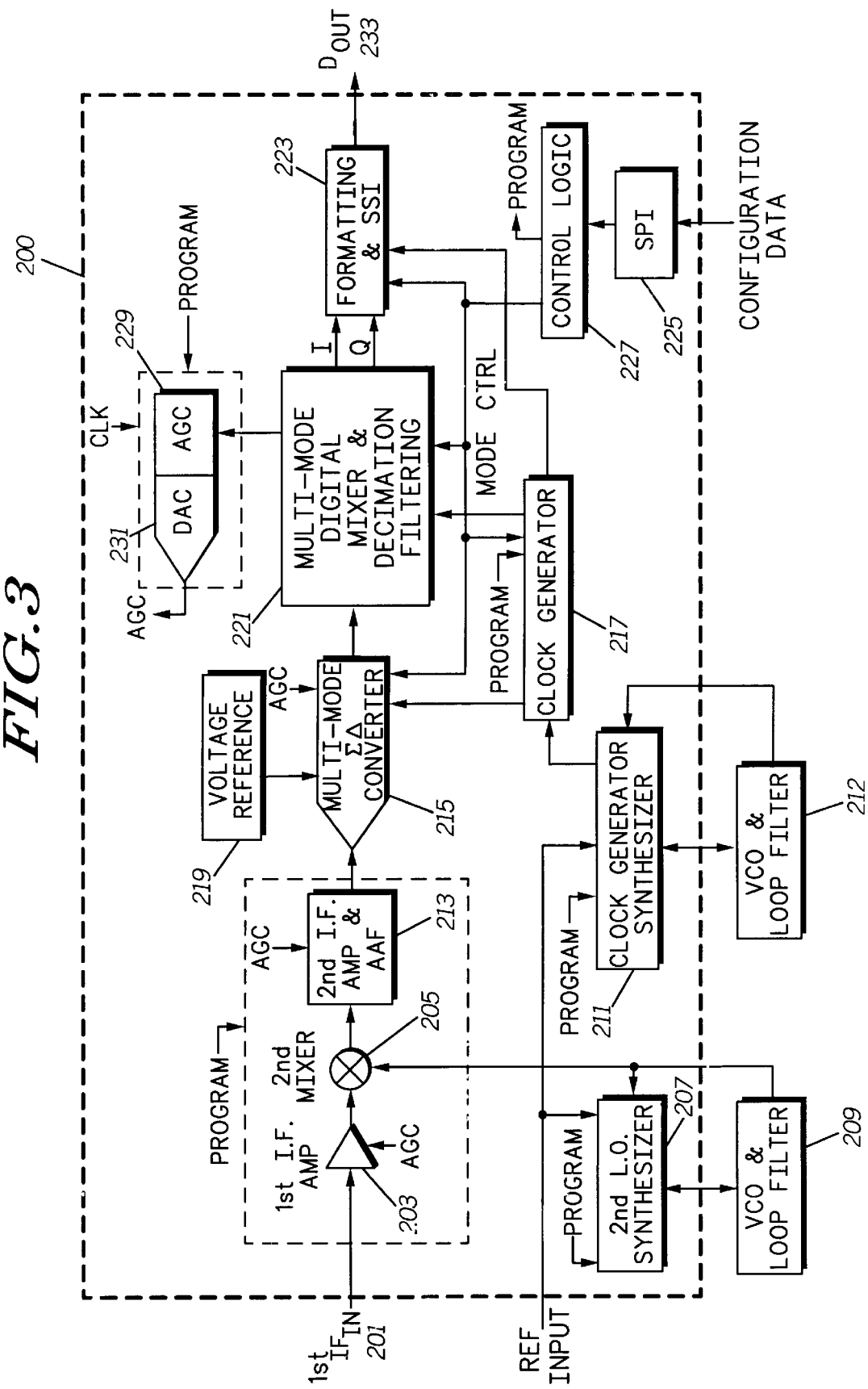
FIG. 3 is a block diagram showing the multi-mode sigma-delta receiver subsystem with interference mitigation according to the present invention.

In FIG. 3, a multi-mode bandpass sigma-delta (Σ-Δ) receiver subsystem with interference mitigation 200, in accordance with the preferred embodiment of the invention, includes a first IF signal input 201 that is fed to a first IF amplifier 203 whose gain may be controlled with an automatic gain control (AGC) input. The first IF signal input to the first IF amplifier is typically between 10 MHz and 400 MHz. Due to the wide range of second IF frequencies that can be used, this acts as an aid to mitigate any potential interference with on-board oscillators or synthesizers since the input signal to the Σ-Δ converter 215 can be controlled. The amplified first IF signal is then mixed with the input from the programmable second local oscillator (LO) synthesizer 207 and a voltage controlled oscillator (VCO) and loop filter 209.

The output of the second mixer is intended to produce a lower frequency for the input to the Σ-Δ converter 215 discussed below. The second IF signal is amplified using a second IF amplifier 213, whose gain is also controlled using an AGC signal discussed hereinafter. The second IF amplifier 213 also provides anti-aliasing filtering (AAF). As is well known in the art, spurious or alias signals occur when sampling a signal waveform based on Nyquist criteria. Alias signals can be created or "folded-back" in-band that can later act to interfere or reduce performance of subsequent receiver stages and processing. In order to remove these alias signals, continuous time filtering techniques are most often employed.

The output of the second IF amplifier 213 is then fed to a multi mode bandpass Σ-Δ analog-to-digital converter (ADC) 215. The use of the Σ-Δ converter 215 and voltage reference 219 produce a digital signal from its input analog signal. As will be recognized by those skilled in the art, the Σ-Δ converter offers many advantages. These include a wide dynamic range within the bandwidth of interest due to the feed-back offered within the converter. The IF frequency band is determined by the integrated switched capacitor filter networks and feed forward/feed back parameters of the Σ-Δ converter. This band generally will be centered at the second IF input frequency. Thus, any extraneous noise produced outside this band by the analog-to-digital converter will be eliminated through subsequent digital filtering. Additionally, the Σ-Δ converter 215 is operable at a variety of IF input frequencies easily programmed by changing the frequency of the clock generator 217. Finally, the Σ-Δ converter 215 offers a multiple bandwidth (multi-mode) option as well as providing reduced power consumption when lower bandwidth mode(s) are selected. Specifically, wideband signals need higher sampling rates while higher sampling rates require a higher current drain. The multi-mode architecture allows for substantial current drain savings through alternate switching between narrow-band and wide-band modes as necessary.

The clock generator 217 is controlled by the programmable clock generator synthesizer 211 and VCO and loop filter 212 and operates to synchronize operation of both the Σ-Δ converter 215 and the digital mixer!decimation network 221. The clock generator 217 can easily be changed or stepped in order to accommodate a variety of input second IF frequencies to the Σ-Δ converter 215.

A digital signal from the Σ-Δ converter 215 is then applied in a serial bit stream to a digital mixer/decimation network 221. The digital mixer converts the digital data stream out of the Σ-Δ converter into two digital signals, an in phase signal and a quadrature phase signal. The decimation network 221 is used to decimate i.e. reduce the clock frequency and data rate of the incoming digital signals (I and Q) for subsequent digital signal processing. Consequently, the sample rate of the digital signals is reduced. The Nyquist criteria now must be met, in order to prevent and/or eliminate the presence of alias signals. Therefore, it is necessary to both decimate and filter eliminating any alias signals that are produced as a result of this process before further processing can occur. As will be recognized by those skilled in the art, the digital filtering is intended to remove any out of band signals or noise. This programmable capability provides a means for careful placement of spurious responses so as not to degrade receiver performance.

At the output of the decimation network 221, both in-phase (I) and quadrature (Q) bit streams are applied to a formatting network 223. The formatting network 223 has outputs that may be configured via the serial peripheral interface (discussed hereinafter) programming to enable an differential current mode output or differential voltage mode output in addition to the conventional single ended voltage mode output. The formatting network works to organize or format data from both the serial I and Q bit streams for interpretation by a digital signal processor (DSP) (not shown) connected to digital output 233. In order to facilitate data synchronization, formatting block 223 incorporates an embedded word sync functionality. Typically, a 16-bit word is produced from the in-phase information, and a 16-bit word is produced from the quadrature information and a 16-bit word is produced for use as automatic gain control (AGC) information. The synchronous serial interface works to insert synchronous information to determine the start and stop portions for each of these words for subsequent use by a DSP.

A serial peripheral interface (SPI) port 225 and the associated control logic 227 are further provided to programmably control the clip level of the digital signal in the multi-mode Σ-Δ converter 215. This controls the input voltage value within an acceptable limit to maintain the input within a predetermined dynamic range. Since the digital signal is supplied to the DSP circuitry (not shown) located off-chip, the DSP provides additional control of the AGC levels to each of the various AGC controlled components through the SPI port 225. This operates using control logic 227 where configuration data is entered though the SPI port 225. The control logic 227 operates with a programmable AGC circuit 229 whose digital output signal is converted to an analog signal through the use of a digita-to-analog converter 231. The AGC output signal is then used to control the second IF amplifier 213, the second mixer 205, the first IF amplifier 203 and the multi mode Σ-Δ ADC 215.

The SPI port 225 can also used to program the control logic 227 which in turn enables such features as enhanced sampling rates, better save modes, bandwidth selection, synthesizer programming, test modes, etc. The first I.F amplifier 203 and second mixer 205 each include bias circuitry controlled by the control logic 227. The advantage of this implementation is that a DSP can increase or decrease bias currents 204, 206 based on a number of parameters, namely, the receiver 50 internal SSI (signal strength indicator), the desired third order input intercept requirement, and the facilitation of "test mode". If a dynamic input intercept is desired the DSP will accept SSI levels as input and output corresponding data to the SPI port 225 to raise or lower bias supply currents 204, 206. This dynamic input intercept will result in lower power consumption in the receiver 50. If an input third order intercept point lower than the "0" dBm nominal is desired in order to reduce power consumption in the receiver for low tier portable products, the DSP can operate to "fix" the front-end bias points and either hold them or allow a dynamic IIP (Input Intercept Point) vs. received signal level so as not to exceed an upper fixed limit. This mode allows the receiver 50 to be utilized by both low tier, power conservative designs and high tier products such as mobile and base station receivers. The fact that bias supply currents 204, 206 are programmable via the SPI port 225 also greatly facilitates receiver testing and troubleshooting.

Additionally as will be evident to those skilled in the art, the interference mitigation portion of the multi mode bandpass sigma-delta (Σ-Δ) receiver subsystem 200 includes an internally controlled continuously adjustable gain element and a stepped gain element provided in the first IF amplifier/mixer block. The receiver subsystem is programmable, via the SPI port, such that AGC thresholds which limit the input signal to Σ-Δ are held below the clip point. The second IF frequencies are programmable via a change in the converter clock rate. Moreover, programmable decimation ratios are used to allow the selection of the final serial data rates in the digital signal processor (DSP). The subsystem is capable of programmable baseband (i.e. about direct current (DC)) bandwidths in both the wide-band (approx. 150 kHz bandwidth) and narrow-band (to less than 3 kHz bandwidth)

modes. The switch from narrow-band to wide-band operation offers a distinct advantage to other receiver systems in the art in that the subsystem 200 is capable of multi-mode operation.

Thus, the present invention is directed "to an integrated sigma-delta radio frequency receiver subsystem that includes a multi-mode sigma-delta analog to digital converter that provides a single and multi-bit output. A digital mixer is used to create in-phase and quadrature phase digital baseband signals with a programmable decimation network for reducing the frequency of the in-phase and quadrature bit streams. Finally, a programmable formatting network is used for organizing the in-phase and quadrature components from the decimation network for subsequent signal processing.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An integrated sigma-delta radio frequency (RF) receiver subsystem comprising:
    a dynamically adjustable programmable intermediate frequency (IF) amplifier/mixer subsystem, comprising at least one IF amplifier/mixer with programmably adjustable supply current;
    a multi-mode sigma-delta analog-to-digital converter for providing a single and multi-bit output;
    a digital mixer for creating in-phase (I) and quadrature phase (Q) digital baseband signals;
    a programmable decimation network for reducing the frequency of the in-phase and quadrature digital baseband signals; and
    a programmable formatting network for organizing the in-phase and quadrature components from the decimation network for subsequent signal processing.

2. The integrated sigma-delta RF receiver subsystem as in claim 1, wherein the multi-mode sigma delta analog-to-digital converter includes an integrated switched capacitor filter.

3. The integrated sigma-delta RF receiver subsystem as in claim 1, wherein the multi-mode sigma-delta analog-to-digital converter is controlled using an automatic gain control (AGC) signal.

4. The integrated sigma-delta RF receiver subsystem as in claim 3, wherein the AGC signal is controlled internally and through digital signal processing.

5. The integrated sigma-delta RF receiver subsystem as in claim 1, wherein the programmable intermediate amplifier/mixer system comprising;
    at least one mixer;
    a mixer amplifier for amplifying an output signal controlled by the at least one mixer; and
    wherein the mixer amplifier is controlled using an automatic gain control (AGC) signal.

6. The integrated sigma-delta RF receiver subsystem as in claim 5, wherein the AGC signal is provided internally and through digital signal processing.

7. The integrated sigma-delta RF receiver subsystem as in claim 1, further comprising a programmable clock generator for controlling the input passband frequency of the multi-mode sigma-delta analog-to-digital converter.

8. The integrated sigma-delta RF receiver subsystem as in claim 1, further comprising at least one interface for providing programming information from a digital signal processor for providing an automatic gain control (AGC) signal.

9. The integrated sigma-delta RF receiver subsystem as in claim 1, wherein the decimation network includes at least one digital filter for removing alias signals.

10. The integrated sigma-delta RF receiver as in claim 9, wherein the at least one digital filter is programmable.

11. The integrated sigma-delta RF receiver subsystem as in claim 1, wherein the subsequent signal processing is digital signal processing.

12. The integrated sigma-delta RF receiver subsystem as in claim 1, wherein the IF amplifier/mixer subsystem is controlled through at least one serial peripheral interface port.

13. An integrated multi-mode bandpass sigma-delta radio frequency (RF) receiver subsystem with interference mitigation comprising:
    a first dynamically programmable intermediate frequency (IF) amplifier;
    at least one dynamically programmable mixer for mixing the output of the first IF amplifier and an oscillator signal, wherein the first dynamically programmable IF amplifier and the at least one dynamically programmable mixer are dynamically programmable to vary the bias supply voltage in such a manner as to provide at least one of interference mitigation and power efficiency;
    a second IF amplifier for amplifying and filtering the output of the at least one mixer;
    a multi-mode multi-bandwidth sigma-delta analog-to-digital signal converter for providing digital output signals with high dynamic range;
    a digital mixer providing in-phase and quadrature-phase digital output signals;
    a decimation network providing in-phase and quadrature digital output signals at reduced programmable data rate and clock frequencies; and a formatting network for arranging the in-phase and quadrature signals into a predetermined format for use by a digital signal processor.

14. The integrated multi-mode bandpass sigma-delta RF receiver subsystem as in claim 13, wherein the second IF amplifier includes an anti-aliasing filter.

15. The integrated multi-mode bandpass sigma-delta RF receiver subsystem with interference mitigation as in claim 13, wherein the interference mitigation includes removing undesired frequency components aliases from the in-phase and quadrature digital output signals.

16. The integrated multi-mode bandpass sigma-delta RF receiver subsystem with interference mitigation as in claim 15, wherein the undesired alias frequency components are removed using an anti-aliasing filter, altering the programmable clock frequencies, changing the second IF frequency and varying programmable decimation rates.

17. The integrated multi-mode bandpass sigma-delta RF receiver subsystem with interference mitigation as in claim 13, wherein the formatting network formats the in-phase and quadrature output signals into a plurality of multi-bit digital words.

18. The integrated multi-mode bandpass sigma-delta RF receiver subsystem with interference mitigation as in claim 17, wherein the multi-bit digital words include an in-phase word, a quadrature word and an automatic gain control (AGC) word used all by the digital signal processor.

19. The integrated multi-mode bandpass sigma-delta RF receiver subsystem with interference mitigation as in claim 18, wherein multi-bit words are up to 16 bits in length.

20. The integrated multi-mode bandpass sigma-delta RF receiver subsystem with interference mitigation as in claim 13, further comprising 97 programmable clock generator for controlling a input signal frequency to the multi-mode sigma-delta analog-to digital signal converter.

21. The integrated multi-mode bandpass sigma-delta RF receiver subsystem with interference mitigation as in claim 13, further comprising at least one interface for providing programming information from the digital signal processor to provide supplementary control of an automatic gain control (AGC) signal.

22. The integrated multi-mode bandpass sigma-delta RF receiver subsystem with interference mitigation Las in claim 21, wherein the AGC signal controls at least the second IF amplifier.

23. The integrated multi-mode bandpass sigma-delta RF receiver subsystem with interference mitigation as in claim 21, wherein the AGC signal controls the multi-mode sigma-delta analog-to-digital signal converter.

24. The integrated multi-mode bandpass sigma-delta RF receiver subsystem with interference mitigation as in claim 13, wherein the bias supply voltage is adjusted in accordance to received signal strength measurements.

25. A method for controlling an integrated multi-mode bandpass sigma-delta radio frequency (RF) receiver subsystem comprising the steps of:

dynamically programming at least one intermediate frequency (IF) amplifier;

dynamically programming at least one mixer;

providing an input signal from the at least one mixer to a multi-mode sigma-delta analog-to-digital signal converter;

converting the input signal into in-phase and quadrature output digital signals;

reducing the frequency of the in-phase and quadrature output digital signals to provide a decimated signal;

removing any undesired aliasing signal components from the decimated signal to provide a filtered signal;

formatting the filtered signal into a plurality of digital words for use by a digital signal processor; and controlling the gain of the multi-mode sigma-delta analog-to-digital signal converter using an automatic gain control signal adjustable by internal and external control signals.

26. The method for controlling an integrated multi-mode bandpass sigma-delta RF receiver subsystem as in claim 25, wherein an input frequency of the multi-mode sigma-delta analog-to-digital signal converter is controlled using a programmable clock generator.

27. The method for controlling an integrated multi-mode bandpass sigma-delta RF receiver subsystem as in claim 25, wherein the step of providing an input signal includes the steps of:

mixing in the at least one mixer, a first IF signal with a programmable local oscillator signal to provide a programmable second IF signal;

amplifying the second IF signal using a second IF amplifier controlled by the automatic gain control (AGC) signal; and controlling the gain of the second IF amplifier using an automatic gain control signal generated by internal and external control signal.

28. A method for controlling an integrated multi-mode bandpass sigma-delta radio frequency (RF) receiver subsystem as in claim 27, wherein the external control signal simultaneously control both the sigma-delta analog-to-digital signal converter and the second IF amplifier.

29. The method for controlling an integrated multi-mode bandpass sigma-delta RF receiver subsystem as in claim 25, wherein the first IF amplifier and at least one mixer is programmed to control suply voltage bias based on input signal strength.

* * * * *

UNITED STATES PATENT AND TRADEMARK OFFICE
CERTIFICATE OF CORRECTION

PATENT NO. : 6,498,819 B1
DATED : December 24, 2002
INVENTOR(S) : William J. Martin It is certified that error appears in the above-identified patent and that said Letters Patent is hereby corrected as shown below:

Column 7,
Lines 1-5, delete claim 20, and insert therefor

-- 20. The integrated multi-mode bandpass sigma-delta RF receiver subsystem with interference mitigation as in claim 13, further comprising a programmable clock generator for controlling an input frequency to the multi-mode sigma-delta analog-to digital signal converter. --.

Signed and Sealed this

Thirteenth Day of May, 2003

JAMES E. ROGAN
*Director of the United States Patent and Trademark Office*